United States Patent
Caldwell et al.

[15] 3,689,830
[45] Sept. 5, 1972

[54] EXPLODING BRIDGEWIRE TESTER WITH SQUARE WAVE GENERATOR

[72] Inventors: James M. Caldwell, Alexander, Ala.; William R. Day, League City, Tex.; Thomas J. Keating, Plantation, Fla.

[73] Assignee: The United States of America as represented by the Secretary of Army

[22] Filed: April 5, 1971

[21] Appl. No.: 131,312

[52] U.S. Cl. .................................................. 324/51
[51] Int. Cl. .............................................. G01r 31/02
[58] Field of Search ............... 324/51, 54, 66, 73, 133

[56] References Cited

UNITED STATES PATENTS

| | | |
|---|---|---|
| 3,182,253 | 5/1965 | Dorsch et al. ............ 324/66 X |
| 3,201,773 | 8/1965 | Magee ................. 324/133 UX |
| 3,277,364 | 10/1966 | Abrahamson ................ 324/54 |
| 3,389,789 | 6/1968 | Watson et al. ......... 324/54 UX |
| 3,354,389 | 11/1967 | Hordosi .................... 324/73 R |
| 3,495,172 | 2/1970 | Davis .......................... 324/51 |
| 3,502,971 | 3/1970 | Glosek ..................... 324/51 X |
| 3,562,639 | 2/1971 | Wright ........................ 324/51 |

*Primary Examiner*—Gerard R. Strecker
*Attorney*—Harry M. Saragovitz, Edward J. Kelly, Herbert Berl and Aubrey J. Dunn

[57] ABSTRACT

The capacitance of an exploding bridgewire (EBW) with a series spark gap is used as a measure of its acceptability. A square wave is applied to the EBW through a resistor. The resistor and EBW capacitance form an integrator for the square wave. A logic system having inputs connected both to the square wave and to the integrated square wave gives outputs indicative of whether the EBW has low capacitance (open bridgewire), normal capacitance (acceptable), or high capacitance (shorted gap).

2 Claims, 3 Drawing Figures

PATENTED SEP 5 1972　　　　　　　　　　　　3,689,830

James M. Caldwell
William R. Day
Thomas J. Keating,
　　INVENTORS.

३,६८९,८३०

EXPLODING BRIDGEWIRE TESTER WITH SQUARE WAVE GENERATOR

BACKGROUND OF THE INVENTION

Non-destructive testing of electro-explosive devices (EED's) is well known. There are at least two types of EED's: the low power type using heating of a resistive element, and the high power type using exploding of a bridgewire (this last type commonly call an EBW). These devices are usually tested with a "blasting galvanometer" by which continuity of the EED's is tested. Recent EBW's use an exploding wire in series with a spark gap. The spark gap helps prevent improper ignition of the EBW, but does present a problem for testing. Obviously an ohmmeter ("blasting galvanometer") cannot be used to test an EBW having a series gap. One scheme by which one may test such EBW's is by applying a high voltage D-C thereto sufficient to break down the gaps, but limiting the current to prevent firing the bridgewire. This scheme is taught by James B. Wright and James D. Holder in their inventions as set forth in U.S. patent application Ser. No. 790,141, filed Jan. 9, 1969, now U.S. Pat. No. 3,562,639, and Ser No. 791,416, filed Jan. 15, 1969 now U.S. Pat. No. 3,562,640. These inventions have a common assignee with the instant invention. These inventions have the disadvantages that they require bridging of the spark gap by a high voltage. This bridging degrades the contacts defining the gap. Other types of EBW testers measure the resonant frequency of the EBW's, and require interpretation of the test results. The instant invention does not degrade the EBW spark gap, and gives a "go" or "no-go" indication.

SUMMARY OF THE INVENTION

An EBW is tested by applying a square wave thereto through a resistor. The combination of inherent capacitance of the EBW with the resistor acts as an integrator. The square wave and the integrated square wave are applied as inputs to a logic including three one-shot multivibrators, one AND gate, and two inhibit gates. The gates operate in accordance with whether the capacitance of the EBW is high, acceptable, or low.

DESCRIPTION OF THE PREFERRED EMBODIMENT

Figure 1:
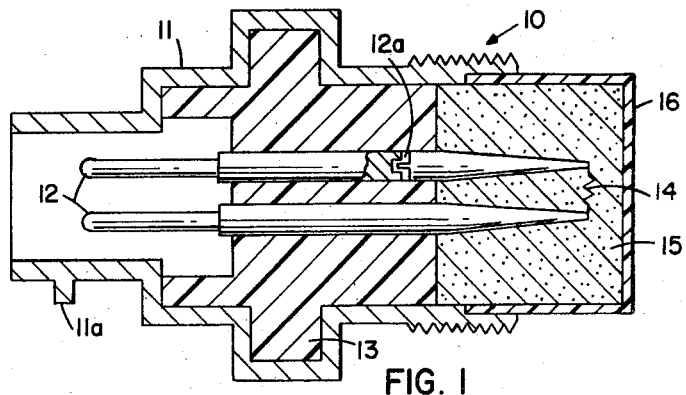
FIG. 1 is a diagramatic view, partly in section, of an EBW which may be tested by the invention.

Referring to the drawings, FIG. 1 shows an EBW, generally designated 10, which may be tested by the instant invention. This EBW includes shell 11 with locating pin 11a, connecting pins 12, insulating support 13 for pins 12, bridge wire 14, explosive 15, and cap 16. One of pins 12 has spark gap 12a.

Figure 2:
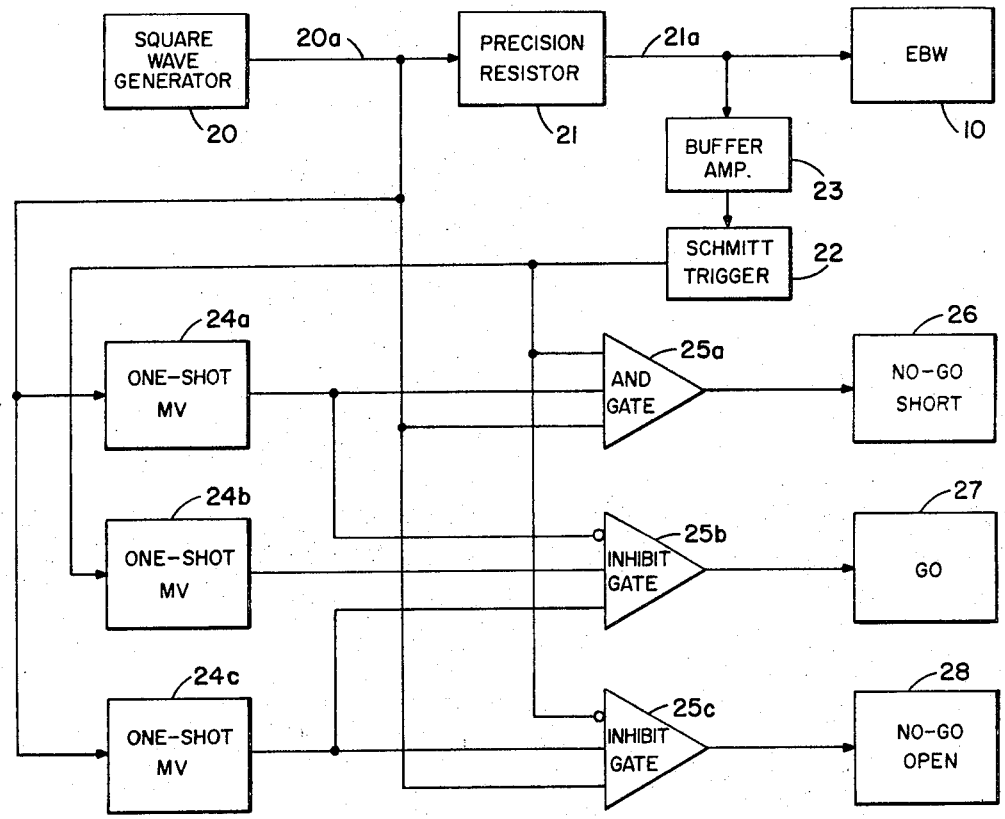
FIG. 2 is a schematic diagram of the invention.

In FIG. 2, EBW 10 of FIG. 1 is connected to square wave generator 20 by precision resistor 21 and conductors 20a and 21a. It should be understood that conductor 21a is terminated in a jack (not shown) having contacts adaptable to mate with one of pins 12 and shell 11 of EBW 10. Shell 11 is connected by the jack to circuit ground (not shown) of FIG. 2. The combination of resistor 21 and EBW 10 forms an integrator for the output of square wave generator 20, inasmuch as 10 normally has capacitance between its pins and shell. The normal value of this capacitance is known, and variations therefrom are indicative of faults in the EBW. In practice, the pin having the spark gap therein is connected to line 21a. If the capacitance is lower than normal, the spark gap is shorted. If the capacitance is higher than normal, the bridgewire is open. For this invention, the output of 20 varies from a zero voltage level to a positive level.

Figure 3:
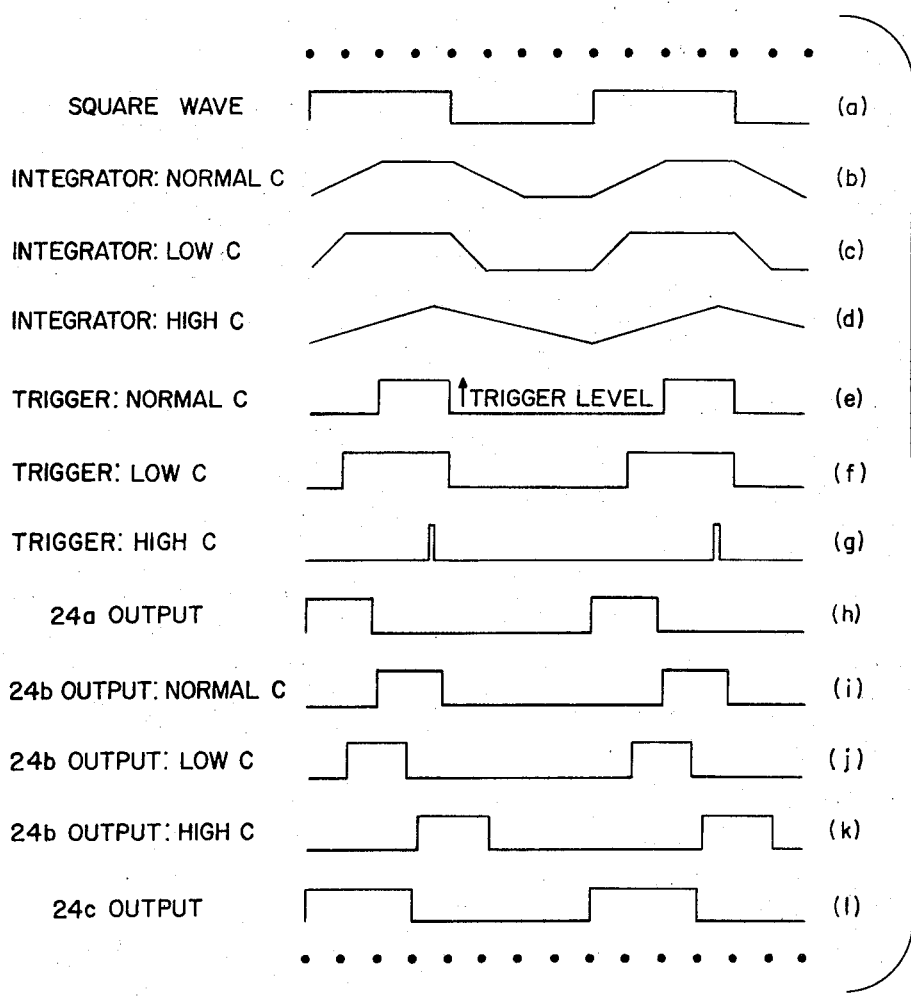
FIG. 3 shows various voltage waveforms from the FIG. 2 circuit.

The integrated square wave is coupled to Schmitt trigger 22 by buffer amplifier 23. For capacitance of 10 lower or higher than normal, the level to which trigger 22 is set will be reached at a time respectively sooner or later than for normal capacitance. The trigger time of 22 is related to the rise time of the square wave in accordance with the capacitance of EBW 10. A logic circuit including one-shot multivibrators 24a, 24b, and 24c, AND-gate 25a, and inhibit gates 25b and 25c has inputs connected to the square wave generator and the Schmitt trigger. Specifically, multivibrators 24a and 24c and gates 25a and 25c have inputs connected to output conductor 20a of square wave generator 20, and multivibrator 24b and gates 25a and 25c have inputs connected to the output of trigger 22. Gates 25a, 25b, and 25c have connected respectively thereto indicators 26, 27, and 28. These indicators may include latching relays or their equivalents energizing lights. The waveforms of FIG. 3 are helpful for understanding the operation of the invention. These waveforms are merely for showing time relationships, and are not to scale vertically. A typical waveform generator 20 is shown by (a) in FIG. 3. The waveforms on line 21a for different values of capacitance of EBW 10 are shown by (b), (c), and (d). Outputs of Schmitt trigger 22 corresponding respectively to (b), (c), and (d) are shown by (e), (f), and (g). The outputs of one-shot multivibrators 24a and 24c initiated by (a), are shown by (h) and (1). Waveforms (i), (j), and (k) show the output of one-shot multivibrator 24b in response to output from trigger 22.

OPERATION

The initial square pulse from generator 20 starts operation of multivibrators 24a and 24c. For a low capacitance (open bridgewire) condition of EBW 10, trigger 22 applies voltage waveform (f) to gate 25a, multivibrator 24b, and gate 25c. Since both the output of multivibrator 24a, as shown by (h) and of square wave generator 20, as shown by (a) are high when 22 triggers, AND-gate 25a will have an output. The output of 25a operates indicator 26. Gate 25b will not operate, since it is inhibited by 24a. For a normal capacitance (acceptable) of EBW 10, waveform (e) is generated. Gate 25a will not be operated, since waveform (e) goes high only after waveform (h) goes low. Gate 25b will be able to operate, since it will not be inhibited by waveform (h) and will have waveforms (1) and (i) applied thereto. The output of 25b operates indicator 27. Gate 25c will be inhibited by waveform (e). For a high capacitance (shorted gap) condition of EBW 10, waveform (g) will be generated. Gate 25c will be operated by waveforms (1) and (a), before (g) rises.

Gate 25a will not operate, since (g) only goes high after (h) has dropped. Gate 25b will not operate, since (1) drops to its low level before (g) rises, and causes (k) to rise.

We claim:

1. A tester for an electro-explosive device wherein said device includes the series connection of a spark gap and an exploding bridgewire, including: a resistor, a square wave generator having an output connected through said resistor to said device; logic means having inputs connected to said square wave generator, and having outputs connected to indicators; a Schmitt trigger voltage level sensing means having an input and an output; said logic means having other inputs connected to said output of said level sensing means, and; said input of said level sensing means connected to the connection of said resistor to said device; wherein said logic means includes first, second, and third one-shot multivibrators each having a trigger input and an output, and AND gate, and first and second inhibit gates, each of gates having inputs and an output, said inhibit gates each having an inhibit input; wherein said first and third multivibrators have their trigger inputs connected to said output of said square wave generator, with the output of said first multivibrator connected to an input of said AND gate and to the inhibit input of said first inhibit gate and the output of said third multivibrator connected to an input of each said second inhibit gate and said AND gate; said trigger input of said second multivibrator connected to the output of said level sensing means, with the output of said second multivibrator connected to an input of said first inhibit gate; said output of said output of said square wave generator being also connected to an input of each said AND gate and said second inhibit gate; said output of said level sensing means being also connected to an input of said AND gate and to the inhibit input of said second inhibit gate; and said indicators being three in number, with a respective indicator connected to a respective output of each of said gates.

2. A tester as set forth in claim 1 wherein said first and third multivibrators have different pulse width outputs.

* * * * *